No. 856,525. PATENTED JUNE 11, 1907.
C. C. GRIGGS & J. C. JENSEN.
SHOCK ABSORBING HUB.
APPLICATION FILED APR. 10, 1906.

2 SHEETS—SHEET 1.

Witnesses
L. Armstrong
C. W. Fowler

Inventors
Charles C. Griggs.
Jens C. Jensen.
By J. Walter Fowler
their Attorney

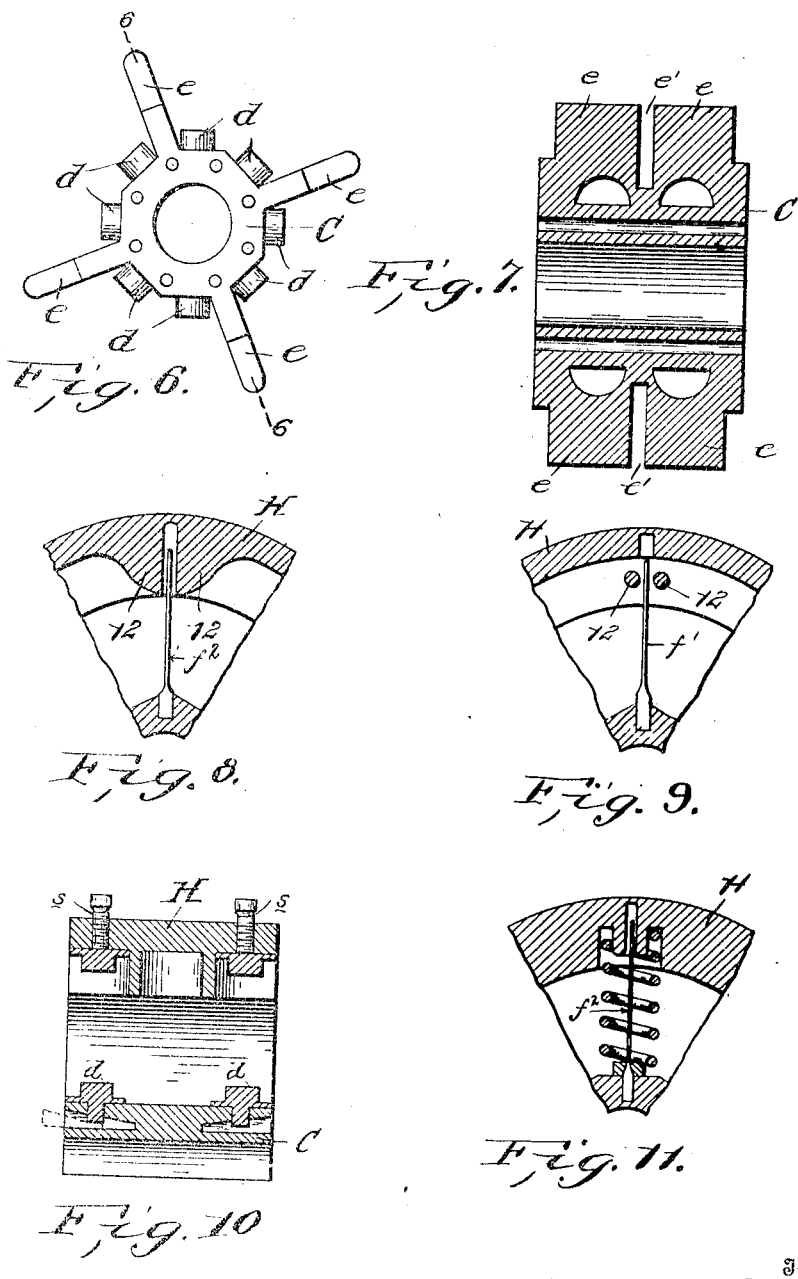

UNITED STATES PATENT OFFICE.

CHARLES C. GRIGGS AND JENS CHRISTIAN JENSEN, OF EUREKA, UTAH.

SHOCK-ABSORBING HUB.

No. 856,525.     Specification of Letters Patent.     Patented June 11, 1907.

Application filed April 10, 1906. Serial No. 310,957.

*To all whom it may concern:*

Be it known that we, CHARLES C. GRIGGS and JENS CHRISTIAN JENSEN, citizens of the United States, residing at Eureka, in the county of Guab and State of Utah, have invented new and useful Improvements in Shock-Absorbing Hubs, of which the following is a specification.

Our invention relates to shock-absorbing or rebounding hubs for vehicles, or rotatable members of any type employing an outer or annular rim portion and an inner portion with intermediate springs, and our invention consists of the parts and the constructions and combinations of parts which will be hereinafter described and claimed.

Figure 1:
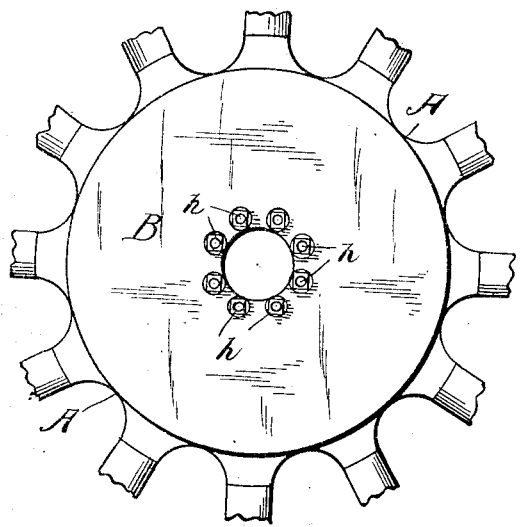
Figure 2:
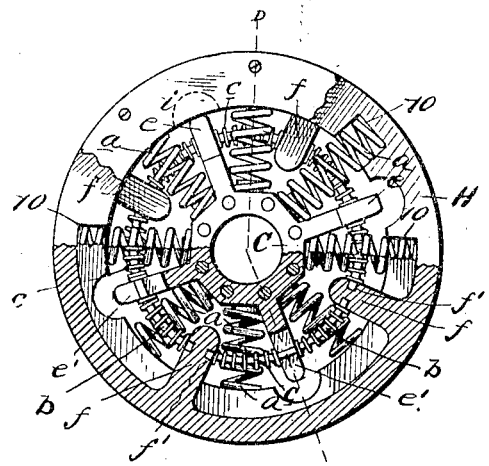
Figure 3:
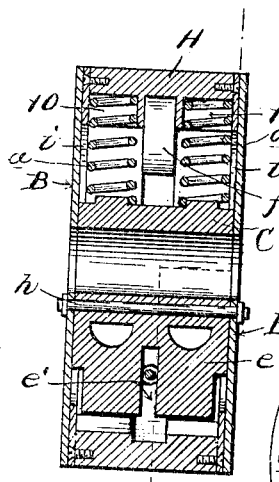
Figure 4:
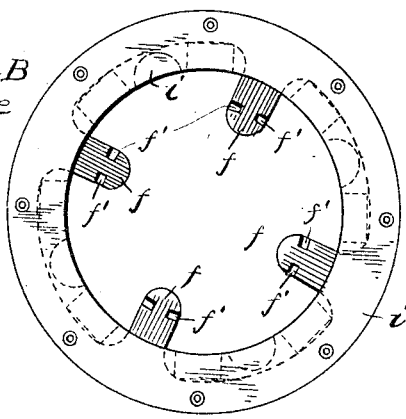
Figure 5:
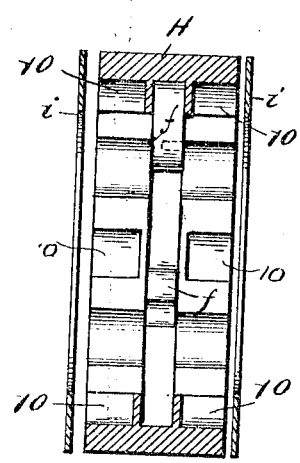

In the accompanying drawings forming part of this specification and in which similar letters of reference indicate like parts in the several views:—Figure 1, is a side elevation of a wheel hub embodying our invention. Fig. 2, is a similar view of a hub showing one of the cover plates removed, and with parts broken away and certain of the radially yielding springs omitted. Fig. 3, is a cross sectional view on the line D—E of Fig. 2. Fig. 4, is a side view of the rim H showing the inwardly extending radial lugs. Fig. 5, is a cross section of Fig. 4, showing the rings or plates *i* detached and positioned alongside of the rim. Fig. 6, is a side view of the inner hub detached. Fig. 7, is a sectional view on the line 6—6 of Fig. 6. Figs. 8, 9, 10, and 11, are modifications to be referred to.

In said drawings A is a hub which for the purposes of illustration may represent the hub of a wheel designed particularly for motor vehicles, although it may also represent in a general way the hub of any other wheel, either manually or motor driven, or the hub of a pulley or other rotatable part of machinery, as the essential features of the invention shown are applicable thereto with but slight changes due to the particular character of the wheel and its hub. Assuming that the hub shown is for an automobile, it will be provided with appropriate and well known sockets for the spokes shown.

The hub consists of inner and outer members one of which, C, we will hereinafter designate as the inner hub, and the other, H, as the rim, and suitable interposed springs or cushions *a* and *c* adapted to so cushion the rim from the inner hub that violent shocks due to the wheel striking obstructions or uneven places in the road, and to uneven loads being thrown on or off in the case of machinery, and the shock to engine or motive power caused by starting wheels or machinery, will be reduced to a minimum. In our hub we diminish the starting torque and thus prolong the life of the wheel or machine, and conduce to the comfort of the occupants of motor vehicles whose wheels are supplied with our invention.

The hub C shown in Fig. 2 is supposed to be rigid with the axle, not shown. When viewed from the end it is of polygonal or many-sided form, and it is cast or otherwise made rigid with the radially projecting arms *e* the outer portions of which are formed with slots *e'*. The angular sides of the hub are also, preferably, cast or made rigid with the projections *d* which form the seats for the inner ends of the raidal springs *a*, which we will hereinafter more fully describe.

The outer member of the hub consists of the annular band or rim H on the inner circumference of which are formed the sockets or seats 10 for the outer ends of the radial springs *a*, these sockets being formed at appropriate distances apart around the rim and opening through the outer sides of the rim to facilitate the insertion and removal of the springs, as shown in Fig. 4.

Bolted or otherwise secured to the outer vertical faces of the rim H are the annular bands or rings *i* which form closures for the outer open sides of the sockets 10 and thereby retain the springs in proper position. These springs are preferably helical, and are arranged to yield in substantially radial planes, as for instance, when the wheel strikes an obstruction in the road; and in the hub shown the springs are arranged in pairs with one member of each pair at one side and the other member of the same pair at the other side of the vertical center of the rim H, said rim having, also, extending inwardly from its inner circumference, the radial lugs *f* each of which is disposed between a pair of springs.

The arms *f* extend into the spaces between adjacent arms *e* of the polygonal hub and beyond the plane of the outer ends of the arms *e*, and their opposite sides are recessed at *f''* to receive the ends of the rods *b* said rods being, preferably, curved and concentric with the rim and inner circumference of the inner hub. The rods extend from the side of one arm $f$ to the adjacent side of the next arm, their middle portions passing through the slot $e'$ in the outer ends of the arms $e$ of the inner hub. Upon these rods between the adjacent faces of the arms $e$ and $f$ are suitably coiled springs $c$ which act in conjunction with the radial springs to absorb or relieve the wheel of the shocks due from any of the causes before noted, or from any other cause.

Over the outer sides of the rim H and hub C and rings or bands $i$, we place close fitting disks or cover plates B which fit flatwise against the rings $i$ and ends of the inner hub and are firmly secured in place and rigidly to the inner hub by means of bolts $h$ which pass through the plates and through holes in the inner hub, and are secured by appropriate nuts. The plates B form an effective barrier against the ingress of dust and dirt to the springs and other internal parts of the hub, and make a close receptacle for lubricants (preferably graphite or oil) and also serve to prevent the hub from collapsing under undue end strain.

While we have shown two sets of radial springs and their adjuncts this is not essential, as the number and arrangement of the springs will vary according to the weight the hub is to carry and the strains to which it is subjected; also the rods $b$ may be other than curved, for instance, straight.

In the case of automobiles and the like, we may use an inner hub like the one shown and hereinbefore described, with its radial and supplemental springs, and rigid radial arms, but for driven wheels which are not self-propelling wheels, the radial arms of the inner hub may each be made of flexible steel so as to possess the requisite spring itself, said arm, $f^2$, in this case, being adapted to operate against suitable lugs or rollers 12 on each side of it and being made rigid with the rim H, as shown in Figs. 8 and 9. In case of light vehicles, such as bicycles, motor-cycles, etc., the radial spring arm $f^2$ just alluded to might enter within the coil of the radial spring, as in Fig. 11.

By means of the radial spring arms, or the rigid arms and supplemental springs $c$, we diminish the starting torque, and shock to engine or motive power, caused by starting wheels or machinery, or by wheels striking objects while running. In case of machinery or shafting the radial springs might be discarded, in which instance the rim H would have a loose bearing on the shaft, and the inner hub C would be keyed or otherwise fastened to the shaft. By using this arrangement on shafting, or a series of shafting and pulleys, it would avoid and equalize violent shocks due either to uneven loads being thrown off or on, or to sudden changes in power. Wherever the arrangement is used, the life of the machinery is increased, whether in a vehicle or in a line of shafting, and in all cases we will have an increase in power due to the even manner in which the power is applied through the supplemental springs $c$, and spring arms.

Provision may be made for adjusting the tension of the radial helical springs. The adjustment may be made from the bottom as in Fig. 10; or it may be made from the top as in Fig. 10. If made from the bottom, the lug $d$ can be made with a movable seat, to move radially for the spring to rest upon. This may then be raised up and down, adjusting the tension of the spring, by suitable means, as a key or wedge inserted in a slot formed between the bolt holes $h$ in the inner hub, as in Fig. 10, and adapted to raise the spring seat as required. For the top adjustment, a set screw $s$ may be passed through the rim H and adapted to engage and adjust the seat or socket member in which the upper or outer end of the spring is received.

Having thus described our invention what we claim as new and desire to secure by Letters Patent is:

1. A shock absorbing hub comprising a rim portion provided with inwardly projecting lugs, said rim having, also, recesses or sockets in its inner circumference and leading through the outer side of the rim, a ring or cover plate fitting against said outer side of the rim and closing the open sides of the sockets, a hub having radial projections arranged to enter the interspaces between the lugs of the outer rim, radial springs between the rim and hub and having one end seated in said sockets, and cushions interposed between the lugs of rim and hub respectively and compressible when the rim is moved relatively to the hub.

2. A shock absorbing hub comprising an outer rim having radial lugs spaced around its inner periphery and projecting inwardly, an inner hub having arms extending outwardly into the interspaces between adjacent lugs on the rim, rods extending across said interspaces and having their intermediate portions substantially embraced by the outer ends of the radial arms of the inner hub, and springs on said rods one upon each side of the arms and compressible between the latter and the lugs, substantially as described.

3. A shock absorbing hub comprising an outer rim having lugs projecting radially inward from the central portion; an inner hub having arms extending radially outward and into the interspaces between adjacent lugs, said arms having their outer ends slotted; rods fixed in place between the faces of adjacent lugs said rods passing through the slots in said arms; radial springs interposed between the rim and inner hub; and supplemental springs on the rods one upon each side of the arms, and compressible between the latter and the lugs, substantially as described.

4. A shock absorbing hub having in combination an outer rim provided with spaced inwardly projecting lugs, said rim having, also, recesses or sockets in its inner circumference and leading through the outer side of the rim, an inner hub having projections on its outer circumference and having arms extending radially outward into the interspaces between adjacent lugs on the rim, radial springs having one end seated on the said lugs of the inner hub and the opposite end fitting the recesses or sockets in the rim, supplemental springs interposed between the arms of the hub and the lugs on the rim, and a ring fitting flatwise against the outer side of the rim and closing the open sides of the sockets whereby the radial springs are removably confined in place.

5. In a shock absorbing hub the rim portion, the inner hub portion, and the radial springs therebetween, said hub having seats for the inner ends of the springs and said rim having sockets around its inner circumference, and opening through the outer sides of the rim, a ring fitting over and closing the open outer sides of the sockets, and disks or plates bolted to the hub and covering the outer sides of the rim and the internal parts and thereby protecting them from dirt and dust.

In testimony whereof we have hereunto set our hands in presence of two subscribing witnesses.

CHARLES C. GRIGGS.
JENS CHRISTIAN JENSEN.

Witnesses:
WILLIAM L. CROFF,
WILLMAN P. CARTER.